PIERRE LUCIEN QUARANTE AND ELISABETH D'ESCALONNE, OF PARIS, FRANCE.

COMPOSITION FOR PRESERVING WOOD, &c.

SPECIFICATION forming part of Letters Patent No. 380,593, dated April 3, 1888.

Application filed August 24, 1887. Serial No. 247,732. (No specimens.)

*To all whom it may concern:*

Be it known that we, PIERRE LUCIEN QUARANTE and ELISABETH D'ESCALONNE, both of the city of Paris, France, have invented a new and useful Composition for the Preservation of Wood and other Vegetable Matter.

This invention relates to the preservation of wood, vegetable tissues, cables, ropes, cordage, grain, and seed by means of acetate of alumina, together with subacetate of lead, pyrolignite of lead, and glycerine.

The importance of this preparation consists in its being saturated by the bases so far as the constitution of the salts and their conditions of solubility will admit. The proportions of the salts are also very important.

For preserving wood and rendering it uninflammable, the preservative may either be injected in a closed chamber (by the aid of a vacuum and pressure or by the Boucherie process) or the wood may be immersed in the liquid, the same method of immersion being also applied for the preservation of cereals and seed, as well as of canvas, cables, ropes, and cordage. This mixture can be very economically applied, and is free from the objections attending the use of creosote and sulphate of copper. Wood preserved by this means has been found to be perfectly sound after being placed for ten years in damp ground, to which term at least another twenty years may be added, nor is there any apparent reason why it should not always remain sound.

Iron, even if galvanized, when brought in contact with wood preserved with sulphate of copper causes its decay and no longer adheres thereto, whereas by using this improved preservative the wood remains uninjured under similar circumstances. By filling the pores of the wood until it will no longer retain more of the preservative liquid it may be rendered imputrescible, uninflammable, and almost incombustible.

Grain and seeds treated by our process germinate twenty-five per cent. better than those treated by other agents, and the plants are stronger.

All other vegetable products, cordage, and canvas may be preserved for an indefinite time by immersing them for a longer or shorter period in the liquid, according to the nature of the article to be preserved.

For the purposes of our invention, we employ the acetates and pyrolignites of alumina, lime, and baryta, (or borate of soda,) together with the subacetate and pyrolignite of lead, for the preservation of organic matters by salts, which are as highly saturated with bases as their constitution and conditions of solubility will permit. By the addition of a small proportion of glycerine to the solutions very long lengths of timber may be treated as well as hard woods, which could not otherwise be penetrated.

The great difficulty to be overcome in the composition of the preservative consists more particularly in the quantities of the salts employed, and it is only after long experience that we have been enabled to arrive at such perfection in our solutions as will insure perfect penetration and preservation.

Although lime, baryta, and borate of soda will serve for our solutions, we prefer the following solution, the advantages of which are incontestable: We dissolve in one thousand liters of water acetate of alumina, six kilos; subacetate of lead, two liters; pyrolignite of lead, six kilos; glycerine, five per cent.

As an evidence of the economy gained over other preservative agents hitherto employed, we give as an example the exact depth to which the preservative penetrates in the case of a railway-sleeper: soft wood, forty-five centimeters; hard wood, thirty-five centimeters.

We claim—

A composition of matter for preserving wood, grain, seeds, cordage, fabrics, and other vegetable matters, consisting of a liquid composed of a solution of acetate of alumina, subacetate of lead, pyrolignite of lead, and glycerine, as described, and in the proportions specified.

The foregoing specification of our new processes for the preservation of wood and other vegetable matters signed by us this 8th day of August, 1887.

PIERRE LUCIEN QUARANTE.
  ELISABETH D'ESCALONNE.

Witnesses:
 ROBT. M. HOOPER,
 ALBERT MOREAUX.